US008110289B2

(12) United States Patent
Koizumi et al.

(10) Patent No.: US 8,110,289 B2
(45) Date of Patent: *Feb. 7, 2012

(54) SINTERED BODY, RESIN PARTICLES AND METHOD FOR PRODUCING THE SAME

(75) Inventors: Yohsuke Koizumi, Kawasaki (JP); Hatsuyo Ohyagi, Fuji (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/757,678

(22) Filed: Apr. 9, 2010

(65) Prior Publication Data

US 2010/0203335 A1 Aug. 12, 2010

Related U.S. Application Data

(63) Continuation of application No. 10/485,396, filed as application No. PCT/JP02/07864 on Aug. 1, 2002, now Pat. No. 7,758,953.

(30) Foreign Application Priority Data

Aug. 2, 2001 (JP) ................................. 2001-234813
Dec. 11, 2001 (JP) ................................. 2001-377694

(51) Int. Cl.
*B32B 27/00* (2006.01)

(52) U.S. Cl. ........ 428/403; 428/357; 428/407; 525/242; 525/244; 525/262; 525/302; 525/303; 525/326.1; 523/200; 523/205; 524/504

(58) Field of Classification Search ........................ None
See application file for complete search history.

(56) References Cited

U.S. PATENT DOCUMENTS

| 3,115,418 | A | * | 12/1963 | Magat et al. ................... 428/420 |
| 3,629,998 | A | | 12/1971 | Takehisa |
| 3,817,969 | A | | 6/1974 | Mueller-Tamm et al. |
| 3,975,481 | A | | 8/1976 | Baumgaertner |
| 4,322,278 | A | | 3/1982 | Cromer |
| 4,678,844 | A | | 7/1987 | Sakuragi et al. |
| 5,049,253 | A | | 9/1991 | Izuo et al. |
| 5,140,074 | A | | 8/1992 | DeNicola et al. |
| 5,356,998 | A | | 10/1994 | Hobes |
| 5,411,994 | A | | 5/1995 | Galli et al. |
| 5,489,648 | A | | 2/1996 | Okimura et al. |
| 5,523,358 | A | | 6/1996 | Hirose et al. |
| 5,539,057 | A | | 7/1996 | Giroux |
| 5,648,400 | A | | 7/1997 | Sugo et al. |
| 5,652,281 | A | | 7/1997 | Galli et al. |
| 5,859,074 | A | | 1/1999 | Rezai et al. |
| 6,379,551 | B1 | * | 4/2002 | Lee et al. ....................... 210/638 |
| 6,559,235 | B2 | | 5/2003 | Cohen et al. |
| 7,758,953 | B2 | * | 7/2010 | Koizumi et al. ........... 428/304.4 |
| 2002/0033365 | A1 | | 3/2002 | Patil |

FOREIGN PATENT DOCUMENTS

| EP | 0346773 A2 * | 12/1989 |
| EP | 0 519 341 A1 | 6/1992 |
| EP | 1437376 A1 * | 7/2004 |
| JP | 51-23492 A | 2/1976 |
| JP | 57-109837 A | 7/1982 |
| JP | 59-12949 A | 1/1984 |
| JP | 62-48725 A | 3/1987 |
| JP | 63-308016 A | 12/1988 |
| JP | 5-209071 A | 8/1993 |
| JP | 7-41574 A | 2/1995 |
| JP | 7-204429 A | 8/1995 |
| JP | 7-206912 A | 8/1995 |
| JP | 10-216717 A | 8/1998 |
| WO | WO-99/09091 A1 | 2/1999 |
| WO | WO-01/29104 A1 | 4/2001 |

OTHER PUBLICATIONS

Seong-Ho Choi et al., "Radiolytic Immobilization of Lipase on Poly (Glycidyl Methacrylate)-grafted Polyethylene Microbead", Micromolecular Research, vol. 12, No. 6, pp. 1-7, 2004.*
Satoshi Tsuneda et al., "Simple Introduction of Sulfonic Acid Group onto Polyethylene by Radiation-Induced Cografting of Sodium Styrenesulfonate with Hydrophilic Monomers", Ind.Eng.Chem. Res. Vo. 32, pp. 1464-1470, 1993.*
"Free-flowing", Merriam-Webster Online, Aug. 27, 2008, http://www.merriam-webster.com/dictionary/free-flowing.
Masukawa Toru et al., "Complex Crosslinked Polymer Particles and Its Production", Machine translation of JP 07-206912, Aug. 8, 1995.
ASTM D1238 Test method titled "Standard test method for flow rates of thermoplastics by extrusion plastomer", pp. 272-280, 1990.

* cited by examiner

*Primary Examiner* — Alicia Chevalier
*Assistant Examiner* — Anish Desai
(74) *Attorney, Agent, or Firm* — Birch, Stewart, Kolasch & Birch, LLP

(57) ABSTRACT

An adsorptive body is provided which is high in water permeation and gas permeation and can adsorb, concentrate, separate and remove components present in extremely small amounts in a liquid or gas without causing the dissolution of impurities. The present invention relates to a sintered body comprising a mixture of: thermoplastic resin particles having no functional groups with adsorbability; and resin particles having functional groups with adsorbability bonded through graft polymer chains at the surface.

7 Claims, 2 Drawing Sheets

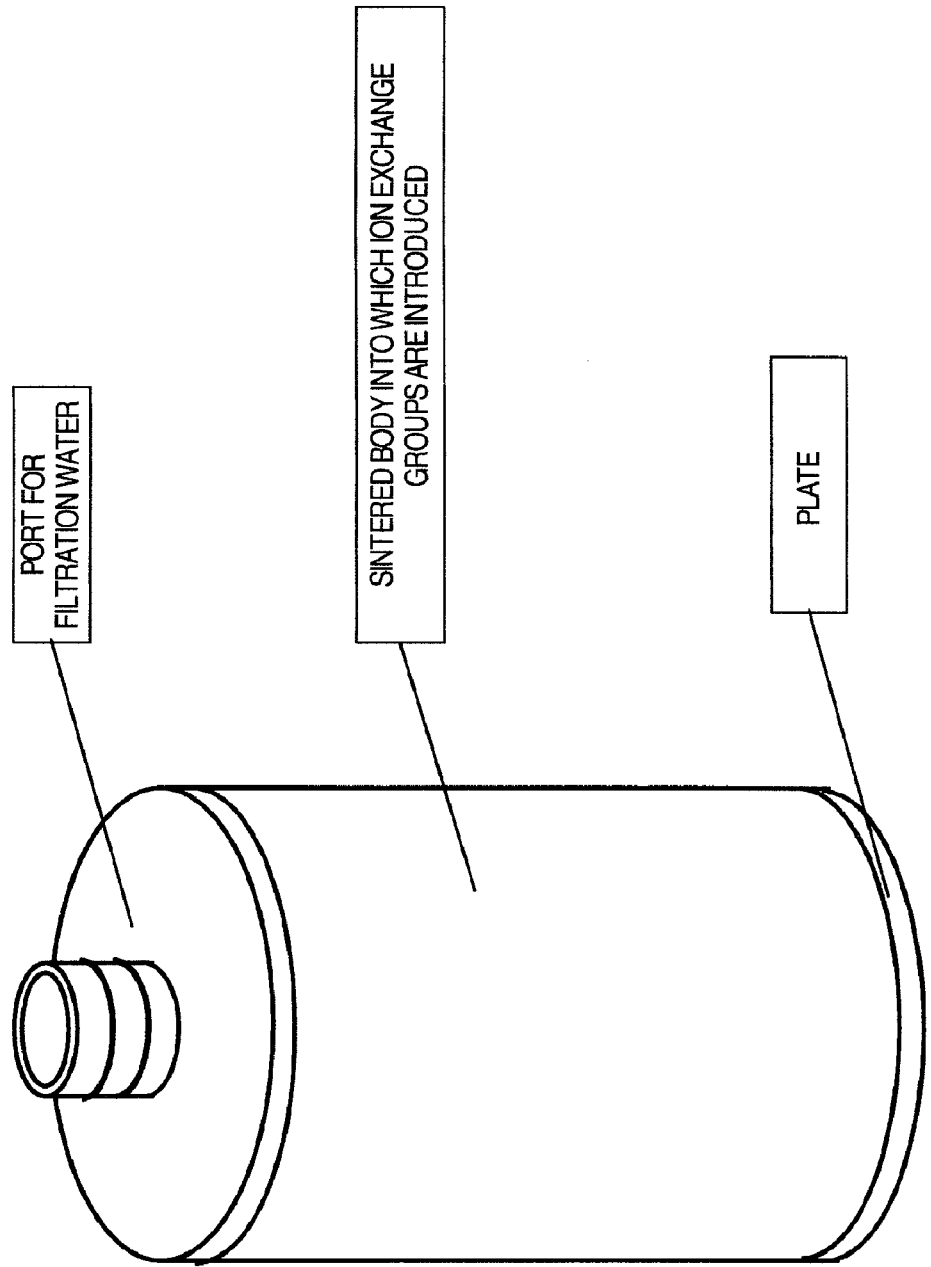

SINTERED BODY, RESIN PARTICLES AND METHOD FOR PRODUCING THE SAME

This application is a Continuation of application Ser. No. 10/485,396 filed on Jan. 30, 2004, now U.S. Pat. No. 7,758,953 and for which priority is claimed under 35 U.S.C. §120. Application Ser. No. 10/485,396 is the national phase of PCT International Application No. PCT/JP02/07864 filed on Aug. 1, 2002 under 35 U.S.C. §371. This application also claims priority of Application No. 2001-234813 and 2001-377694 filed in Japan on Aug. 2, 2001 and Dec. 11, 2001, respectively under 35 U.S.C. §119. The entire contents of each of the above-identified applications are hereby incorporated by reference.

TECHNICAL FIELD

The object of the present invention is to provide an adsorptive body usable for adsorption, concentration, separation and removal of impurities or the like contained in liquids or gases in the treatment of liquids such as water, various aqueous solutions or organic solvents or in the treatment of gas mixtures.

Particularly, the object of the present invention is to provide a porous adsorptive body usable in a process wherein adsorption and removal of fine particles, colloidal substances or metal ions to an extremely low concentration are necessary in order to prepare ultrapure water.

BACKGROUND ART

Recently, for the purpose of reducing influences on the environment, the conversion of industrial processes to those in which various waste products are reduced as much as possible has been started, and interest in the removal of impurities has been growing. As a result, there is an increasing need for the development of a medium capable of adsorbing, concentrating, separating and removing the materials present in a trace amount in gases and liquids.

For example, hitherto, ion exchange resins have been mainly used for the removal of ions in the water in water treatment processes. Conventional ion exchange resins generally have a particle diameter ranging from 300-1200 μm. When such a resin is packed into a resin column and water to be treated is passed through the resin, the probability of contact of ions in the water to be treated with the surface of the resin is small because of large gaps among the resin particles (water flow path). Therefore, particularly the effect to remove ions from water with low ion concentration, such as ultrapure water, is conspicuously low. Furthermore, in the field of using ultrapure water, such as in the semiconductor industries, organic impurities (detected as TOC in the case of ultrapure water) incorporated within the resin during polymerization of the ion exchange resin elutes over a long period of time and thus impurities are brought into the treated water.

Attempts to use a sintered body as a medium for adsorption, removal and separation are disclosed in JP-A-51-23492, JP-A-7-204429, etc.

JP-A-51-23492 discloses a technique in which an adsorbent, such as silica gel or alumina, is mixed with a resin powder, such as a polyolefin resin, to prepare a slurry and this slurry is spread on a support and heated to obtain a sintered body. However, since the inorganic adsorbent, such as silica gel or alumina, could not be adhered to each other at the contacting portions, and, further, the adhesive force with thermoplastic resin powders was low, the adsorptive particles exfoliated from the sintered body. The sintered body thus could never be practically used.

JP-A-51-23492 and JP-A-7-204429 disclose a technique in which an ion exchange resin is mixed with thermoplastic resin particles and sintered, and the sintered mixture is used as a medium. However, since an ion exchange resin is used, the intrinsic problem of incorporation of impurities caused by elution of TOC and the like out of the resin has not yet been solved.

JP-A-57-109837 proposes a method of sulfonating a sintered porous body comprising a polyolefin resin with a sulfonating agent, such as fuming sulfuric acid, to make the sintered porous body hydrophilic. However, since the sintered resin per se is sulfonated, the exchange capacity is small. Besides, with a production method including sulfonation with, for example, fuming sulfuric acid or hot concentrated sulfuric acid, there is the problem of reverse contamination due to the elution of the impurities, i.e. the problem of the production of by-products produced in large amount by oxidation, dehydration, etc, has not been solved as in the case of using an ion exchange resin. In addition, there is a problem that fine particulate materials exfoliate from the resin that has become fragile by side reactions, such as oxidation and dehydration, and are brought into the treated water.

Therefore, in the field of water treatment, the ultrapure water production system using an ion adsorptive membrane has been studied and developed as a new deionization technique for meeting a need for producing ultrapure water which is less in elution of TOC and has high purity (JP-A-5-209071 and JP-A-7-41574). As compared with ion exchange resins, the ion adsorptive membranes have advantages of high ion removing efficiency and less elution of TOC, and can be used in the form of a flat film, a fiber, a hollow fiber, or the like. However, from the viewpoints of balances in separation function, water permeability and mechanical strength, the ranges of pore diameter and membrane thickness to be employed are restricted. In order to increase the surface area of a membrane, for example, when the membrane is in the form of a flat film, it had to be folded into a pleated form in a cartridge, and when it is in the form of hollow fibers, it had to be bundled and formed into a module. Although adsorptive bodies are primarily required to have high adsorption performance, since they are used for treating water or gases, they are not practical unless they are high in water permeability and gas permeability. In this respect a membrane with large thickness and large pore diameter is preferred. It is, however, difficult to produce such a resin by the above technique of producing ion adsorptive membranes.

The present invention provides an adsorptive structure that hardly generates impurities, such as TOC, does not contaminate the treated liquid or gas, and is capable of removing even impurities present at extremely low concentrations.

DISCLOSURE OF INVENTION

According to the present invention, it has been found that an adsorptive body which is less in elution of impurities can be obtained by using resin particles to which functional groups having adsorbability are bonded through graft polymer chains, and as a result of intensive research conducted on the porous sintered body having said adsorbability, a material which satisfies all of the properties of high adsorbability, high water permeability and gas permeability and low elution of impurities has been discovered. Thus, the present invention has been accomplished.

That is, the present invention is as follows.

(1) A porous sintered body of thermoplastic resin particles comprising functional groups having adsorbability bonded through a graft polymer chain at the surface.

(2) A sintered body according to (1), wherein the pores are gaps formed by welding of the thermoplastic resin particles and have an average pore diameter of 1 μm or more and less than 100 μm.

(3) A sintered body according to (1), wherein the sintered body has a porosity of 20% or more and less than 60%.

(4) A sintered body according to (1), wherein the concentration of the functional groups having adsorbability in the sintered body is 0.3 mmol/g or more and less than 10 mmol/g.

(5) A sintered body according to (1), wherein the functional groups having adsorbability are localized at the surface of the thermoplastic resin particles constituting the sintered body.

(6) A sintered body according to (1), wherein the thermoplastic resin is a polyolefin resin.

(7) A sintered body according to (1), wherein the functional groups having adsorbability are ion exchange groups.

(8) A porous sintered body, comprising a mixture of thermoplastic resin particles and resin particles, the resin particles comprising functional groups having adsorbability bonded through graft polymer chains at the surface.

(9) A sintered body according to (8), wherein the pores are gaps formed by welding of the particles constituting the sintered body and have an average pore diameter of 1 μm or more and less than 100 μm.

(10) A sintered body according to (8), wherein the sintered body has a porosity of 20% or more and less than 60%.

(11) A sintered body according to (8), wherein the thermoplastic resin comprises a polyolefin.

(12) A sintered body according to (8), wherein the concentration of the functional groups having adsorbability in the sintered body is 0.3 mmol/g or more and less than 10 mmol/g.

(13) A sintered body according to (8), wherein the proportion of the resin particles comprising functional groups having adsorbability bonded through graft polymer chains in the whole sintered body is 10% by weight or more and less than 70% by weight.

(14) A sintered body according to (8), wherein the functional groups having adsorbability are localized at the surface of the resin particles.

(15) A sintered body according to (8), wherein the resin particles comprising functional groups having adsorbability bonded through graft polymer chains at the surface, are polyolefin resin particles comprising functional groups having adsorbability bonded through graft polymer chains at the surface.

(16) A sintered body according to (8), wherein the functional groups having adsorbability are ion exchange groups.

(17) A resin particle, comprising functional groups having adsorbability bonded through graft polymer chains.

(18) A resin particle according to (17), wherein the functional groups having adsorbability are localized at the surface of the resin particles.

(19) A resin particle according to (17), wherein the resin particle comprise a polyolefin.

(20) A resin particle according to (17), wherein the concentration of the functional groups having adsorbability is 0.3 mmol/g or more and less than 10 mmol/g.

(21) A resin particle according to (17), wherein the functional groups having adsorbability are ion exchange groups.

(22) A resin particle according to (17), wherein the resin particle has a particle diameter of 300 μm or less.

(23) A method for producing a sintered body comprising:
sintering a particle mixture of thermoplastic resin particles having a particle diameter of 300 μm or less and crosslinked resin particles which have a particle diameter of 300 μm or less and to which functional groups having adsorbability can be bonded, to prepare a porous resin matrix, and
bonding functional groups having adsorbability to the resin matrix.

(24) A method according to (23), wherein the mixing ratio of the crosslinked resin particles to which functional groups having adsorbability can be bonded is 10% by weight or more and less than 70% by weight, with respect to the total weight of the mixture.

(25) A method according to (23), wherein the thermoplastic resin particles comprise a polyolefin.

(26) A method according to (23), wherein the crosslinked resin particles are resin particles having a crosslinked layer formed by a graft reaction.

(27) A method according to (23), wherein the crosslinked resin particles are polyolefin resin particles on which a crosslinked layer is formed.

(28) A method according to (23), wherein the functional groups having adsorbability are ion exchange groups.

(29) A method for producing a sintered body, comprising:
sintering a particle mixture of thermoplastic resin particles having a particle diameter of 300 μm or less and resin particles which have a particle diameter of 300 μm or less and to which functional groups having adsorbability are bonded through graft polymer chains.

(30) A method according to (29), wherein the mixing ratio of the resin particles to which functional groups having adsorbability are bonded through graft polymer chains is 10% by weight or more and less than 70% by weight, with respect to the total weight of the mixture.

(31) A method according to (29), wherein the thermoplastic resin particles comprise a polyolefin.

(32) A method according to (29), wherein the resin particles to which the functional groups having adsorbability are bonded through graft polymer chains are polyolefin resin particles to which the functional groups having adsorbability are bonded through graft polymer chains.

(33) A method according to (29), wherein the functional groups having adsorbability are localized at the surface of the resin particles.

(34) A method according to (29), further comprising:
converting the functional groups having adsorbability to a metal salt before the sintering.

(35) A method according to (29), wherein the functional groups having adsorbability are ion exchange groups.

(36) A method for producing a sintered body, to the surface of which functional groups having adsorbability are bonded, comprising:
forming a crosslinked layer on the surface of the sintered body of thermoplastic resin particles, and
reacting the functional groups which have adsorbability and are capable of reacting with the crosslinked layer.

(37) A method according to (36), wherein the thermoplastic resin particles constituting the sintered body of the thermoplastic resin particles have a particle diameter of 300 μm or less.

(38) A method according to (36), wherein the thermoplastic resin particles comprise a polyolefin.

(39) A method according to (36), wherein the crosslinked layer is formed by irradiating the sintered body of the thermoplastic resin particles with radiation and contacting the sintered body with a reactive monomer under stirring in a solvent which does not swell the thermoplastic resin particles, and the functional groups which have adsorbability and are capable of reacting with the crosslinked layer are reacted in the liquid phase.

(40) A method according to (36), wherein the functional groups having adsorbability are ion exchange groups.

(41) A method for producing a resin particle to the surface of which functional groups having adsorbability are bonded, comprising:

forming a crosslinked layer on the surface of the resin particle, and reacting the crosslinked layer with functional groups which have adsorbability and are capable of reacting with the crosslinked layer.

(42) A method according to (41), wherein the resin particles have a particle diameter of 300 μm or less.

(43) A method according to (41), wherein the resin particles comprise a polyolefin.

(44) A method according to (41), wherein the crosslinked layer is formed by irradiating the resin particle with radiation and contacting the resin particle with a reactive monomer under stirring in a solvent which does not swell the resin particle, and the functional groups which have adsorbability and are capable of reacting with the crosslinked layer, are reacted in the liquid phase.

(45) A method according to (41), wherein the functional groups having adsorbability are ion exchange groups.

BRIEF DESCRIPTION OF DRAWINGS

FIG. 2 is a diagrammatic view of a cartridge type filter using the adsorptive sintered body according to the present invention.

BEST MODE FOR CARRYING OUT THE INVENTION

Figure 1:
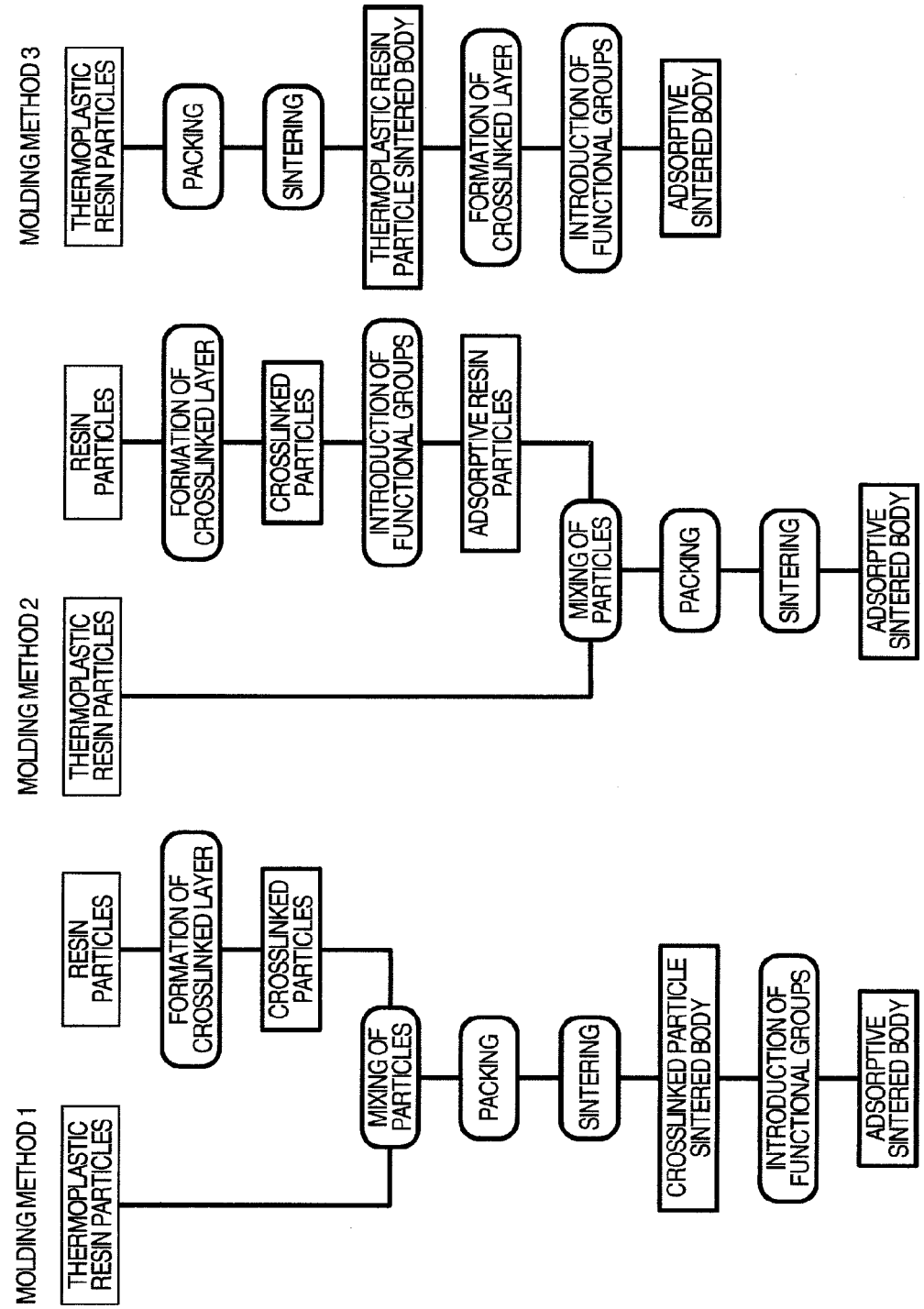
FIG. 1 shows flow charts of production of the adsorptive sintered body according to the present invention.

In the present invention, adsorptive functional groups are introduced into a sintered body per se and, hence, the adsorptive groups are present on the surface of the sintered body. Therefore, an adsorptive body excellent in adsorbability and with a small elution of impurities is obtained.

In the sintered body of the present invention, the pore diameter of the sintered body is controlled by the particle diameters of a thermoplastic resin and resin particles, into which adsorptive functional groups are introduced, to be sintered, and the thickness of the sintered body is controlled by the gap within a metal mold into which the particles are packed. Therefore, a sintered body with large pore diameter can be easily molded, and even when a number of adsorptive groups are introduced, fine pores are not clogged and thus the porosity of the sintered body can be maintained. Thus, both the adsorption capacity and the water and gas permeation amounts can be increased.

The present invention will be explained in more detail below.

<Thermoplastic Resin Particles>

The thermoplastic resin particles in the present invention (hereinafter referred to as "thermoplastic resin particles") include particulate materials of vinyl chloride resins including polyvinyl chloride, polyvinylidene chloride, etc.; polyolefin resins, such as polyethylene and polypropylene; polyester resins, such as polyethylene terephthalate; so-called engineering plastics, such as polystyrene, polyamide, polyacetal, polycarbonate, polysulfone, polyether sulfone, polyphenylene sulfide, polymethyl methacrylate, polyether ether ketone, etc.; and fluorocarbon resins such as polyvinylidene fluoride and ethylene-tetrafluoroethylene copolymer.

In the present invention, in the sinter molding step, the thermoplastic resin particles are heated to about the melting point and molten, and the particles are welded together with resin particles to which functional groups having adsorbability are bonded through graft polymer chains (hereinafter referred to as "adsorptive resin particles") at the contact points of the particles to form a structure of a sintered body having pores composed of gaps among the particles.

Therefore, it is important to select a thermoplastic resin having a proper melting point, depending on the heat resistance of the functional groups of the adsorptive resin particles. Especially, at a high temperature of 180° C. or higher, the functional groups are vigorously heat decomposed and hence it is preferred to use a resin, the particles of which are welded at a temperature of 180° C. or lower.

Furthermore, if the melt-flow characteristics of the thermoplastic resin are great, it undergoes flow deformation at the step of sinter molding to cause problems such as the clogging of pores and the covering of the surface to which functional groups are bonded. Therefore, thermoplastic resins which hardly flow are preferred. As to the index of the fluidity of the molten thermoplastic resin, for example, by MI (melt index) value measured in accordance with ASTM D1238, it is preferably 0.5 g/10 min or less, and more preferably 0.1 g/10 min or less. The thermoplastic resins may be those which hardly flow to such an extent that the MI value cannot be measured.

Of the thermoplastic resins, polyolefin resins such as polyethylene and polypropylene, and polyvinylidene fluoride which is relatively low in melting point among fluorocarbon resins are preferred because they are inexpensive, excellent in chemical resistance and processability, and low in water vapor absorption and water absorption. As the polyolefin resins, mention may be made of polyethylene, polypropylene, ethylene-propylene copolymer, ethylene-butene-1 copolymer, ethylene-hexene-1 copolymer, ethylene-pentene-1 copolymer, ethylene-octene-1 copolymer, ethylene-4-methylpentene-1 copolymer, ethylene-vinyl acetate copolymer, ethylene-(meth)acrylic acid copolymer, ethylene-(meth) acrylate copolymer, etc. Among them, polyethylene is suitable for the reasons that particles to be sinter molded can be easily obtained, the sinter molding is easily carried out, and it is superior in chemical resistance. From the viewpoint of fluidity at the step of sinter molding, high-molecular weight polyethylenes of 100,000 or more in weight-average molecular weight are preferred because the fluidity is low and pores can be easily formed by forming gaps among the particles. More preferred are ultra-high-molecular-weight polyethylenes of 1,000,000 or more in weight-average molecular weight.

The shape of the thermoplastic resin particles used in the present invention is not particularly limited. The particles may be in the form of true spheres or amorphous, and may comprise primary particles, secondary particles wherein a plurality of primary particles are agglomerated and integrated, or secondary particles which are further pulverized.

The particle diameter is preferably 300 μm or less, more preferably 10 μm or more but less than 100 μm. The particle diameter in the present invention is an average particle diameter, and is shown by an average value of minor axis and major axis of 50 or more resin particles measured in a magnified photograph of the resin particles. If the particle diameter is more than 300 μm, the size of the pores of the resulting sintered body will also be large, and the frequency of meeting of the materials to be adsorbed and the adsorptive functional groups will be lowered to result in the reduction of adsorption efficiency. Conversely, if the particle diameter is less than 10 μm, the size of pores of the sintered body will be small, and water and gas permeability will decrease, which is not practical.

<Crosslinked Particles and Adsorptive Resin Particles>

As the resins used for the adsorptive resin particles of the present invention, there may be used natural resins, such as cellulosic resins, and, in addition, thermosetting resins, such as phenolic resins, urea resins, melamine resins, unsaturated polyester resins, allyl resins, and epoxy resins; and thermoplastic resins, e.g., vinyl chloride resins, such as polyvinyl chloride and polyvinylidene chloride; polyolefin resins, such as polyethylene and poly-propylene; polyester resins such as polyethylene terephthalate; so-called engineering plastics including polystyrene, polyamide, polyacetal, polycarbonate, polysulfone, polyether sulfone, polyphenylene sulfide, polymethyl methacrylate, and polyether ether ketone; and fluororesins, such as polyvinylidene fluoride and ethylene-tetrafluoroethylene copolymer.

Of these resins, polyolefin resins, such as polyethylene and polypropylene, and polyvinylidene fluoride which is relatively low in melting point among other fluorocarbon resins are preferred because they are inexpensive, excellent in chemical resistance have less eluted substances, are low in water vapor absorption and water absorption and have less water elution. In addition, functional groups can be easily introduced into the surface of the resin particles, and they are relatively low in melting point and there occurs less heat decomposition of the adsorptive functional groups during sintering. As the polyolefin resins, mention may be made of polyethylene, polypropylene, ethylene-propylene copolymer, ethylene-butene-1 copolymer, ethylene-hexene-1 copolymer, ethylene-pentene-1 copolymer, ethylene-octene-1 copolymer, ethylene-4-methylpentene-1 copolymer, ethylene-vinyl acetate copolymer, ethylene-(meth)acrylic acid copolymer, ethylene-(meth)acrylate copolymer, etc. Among them, polyethylene is suitable for the reasons that it is easily available in the form of particles, and it is superior in chemical resistance and in the retention of radicals during graft polymerization by irradiation which is utilized for introduction of the adsorptive functional groups.

As in the case of the thermoplastic resin particles, if the melt flow of the resin in use is large, the particles will undergo flow deformation at the step of sinter molding to cause problems such as the hiding of the adsorptive functional groups formed on the surface under the resin itself and the clogging of the pores of the sintered bodies. Therefore, resins which hardly flow are preferred.

For example, in terms of MI value which is an indication of fluidity, the resin preferably has a MI value of 0.5 g/10 min or less, and more preferably 0.1 g/10 min or less. The resins may be those which hardly flow to such an extent that the MI value cannot be measured. High-molecular weight polyethylenes of 100,000 or more in weight-average molecular weight are preferred because they are low in fluidity and cause none of the above problems. Ultra-high-molecular-weight polyethylenes of 1,000,000 or more in weight-average molecular weight are more preferred.

The adsorptive resin particles of the present invention are particulate materials comprising the above resin particles as a substrate, into which functional groups having adsorbability (hereinafter referred to as "adsorptive functional groups") are introduced.

The method for introducing the adsorptive functional groups is preferably a method which can uniformly introduce the groups onto the surface of the resin particles. For example, a suitable method comprises uniformly producing radicals in a substrate, i.e. graft polymerizing a monomer and a crosslinking agent using the radicals as starting points to form a crosslinked layer, and then introducing adsorptive functional groups. Alternatively, a method of directly graft polymerizing a monomer having adsorptive functional groups to bond the adsorptive functional groups together with a crosslinked layer may be used.

A method for uniformly producing radicals on the whole surface includes a method wherein plasma is used, a method wherein light is used, a method wherein radiation is used, and a method wherein any of various radical initiators is used. Especially, when it is intended to assure uniformity, the method of producing radicals by irradiation this is redundant is most suitable.

Ionizing radiation used for radiation graft polymerization suitable for introducing a number of adsorptive functional groups includes α, β, γ rays, electron rays, ultraviolet rays, etc., any of which can be used. Among these γ rays are suitable for more uniformly producing radicals. An economically preferred exposure dose which can give a sufficient amount of radicals for graft polymerization and does not cause unnecessary crosslinking or partial decomposition is 10-300 kGy, preferably 50-100 kGy.

Radiation grafting of the resin particles can be carried out by a simultaneous irradiation method which comprises irradiating a mixture of the resin particles and the monomer, and a pre-irradiation method which comprises previously irradiating the resin particles and then contacting the resin particles with the monomer. Since the production of a single polymer of the monomer is less, the pre-irradiation method is preferred.

The crosslinked layer formed by graft polymerization includes, for example, a copolymer layer formed with styrene and divinylbenzene as monomers, a polymer layer formed with glycidyl methacrylate, a copolymer layer of glycidyl methacrylate and acrylonitrile, a copolymer layer of glycidyl methacrylate and divinylbenzene, etc. Among them, the copolymer of styrene and divinylbenzene is suitable because the reaction can be readily controlled.

The proportion of the crosslinked layer formed by graft polymerization is preferably 50% by weight or more but less than 150% by weight with respect to the weight of the resin particles as the substrate. If the proportion is less than 50% by weight, it will be impossible to introduce a large amount of the adsorptive functional groups. If it is 150% by weight or more, the particle diameter of the crosslinked product will be too large, which tends to increase the pore diameter of the sintered body to result in less adsorbability. The proportion is more preferably 60% by weight or more but less than 120% by weight.

In this way, crosslinked particles into which adsorptive functional groups can be introduced (hereinafter referred to as "crosslinked particles") are obtained.

In order to uniformly introduce adsorptive functional groups onto the surface of the resin particles, it is preferred to carry out the graft polymerization reaction and the functional group introduction reaction in a solvent, namely, in the liquid phase. Furthermore, in order to induce the reaction only in the vicinity of the surface of the resin particles, it is preferred to use a solvent which barely swells the resin in use. Specifically, solvents which have a swelling degree of 10% or less for the resin in use as a substrate are preferred, and, for example, alcohols such as methanol, ethanol, and isopropanol are preferred, and, furthermore, dispersions prepared by dispersing the monomer in water may also be used. The swelling degree, as used herein, is a value obtained by dividing the difference between [particle diameter of resin particles immersed in a solvent for 1 hour] and [particle diameter of resin particles before the immersion], by [particle diameter of resin particles before the immersion].

Thus, adsorptive particles in which adsorptive functional groups are localized on the surface of the particles are obtained, and there can be provided adsorptive materials having less eluted matter, unlike general-purpose ion adsorptive resins.

The term "surface" as used in the present application includes a surface layer portion of up to 5 µm in the depth direction from the surface of the particles.

The degree of the localization of the adsorptive functional groups on the surface is expressed by an indicator of distribution of the adsorptive functional groups which can be measured by the following method.

After embedding the adsorptive resin particles in a resin, the sample is cut by a microtome or the like to expose the section of the particle. The sample having an exposed section is set in a scanning electron microscope and is magnified to a suitable magnification, and then the sample is subjected to a line analysis from the surface to the center of the particle for an element specific to the adsorptive functional group by an energy dispersion type X-ray analyzer (EDX). Intensities at the surface portion and the center portion are read from a line profile of the line analysis. The intensity obtained as a line profile is proportional to the amount of the element in the sample. The indicator of distribution of the adsorptive functional groups is expressed by a value obtained by dividing [intensity of EDX line profile at the center portion of particle (height of peak)] by [intensity of EDX line profile at the surface portion of particle (height of peak)]. That is, when the functional groups are present uniformly from the surface to the center, the intensities of the EDX line profile are equal and the value is nearly 1, and when the functional groups are distributed in a larger amount on the surface, the intensity at the surface portion is higher and the value is smaller than 1.

The value of the adsorptive particles of the present invention is preferably smaller than 0.9, more preferably smaller than 0.8.

The element specific to the adsorptive functional groups means an element which is not contained in the background resin, such as S (sulfur) in the case where the adsorptive functional group is a sulfonic acid group. In the case where the adsorptive functional groups have nearly the same element construction as the resin, analysis can be conducted in the same manner as above after a metal ion or the like is adsorbed to the functional groups.

The concentration of the introduced adsorptive functional groups is preferably 0.3 mmol/g or more but less than 10 mmol/g, more preferably 0.5 mmol/g or more but less than 5 mmol/g with respect to the total weight including the resin. If the concentration is less than 0.3 mmol/g, the concentration is too low, and adsorbability in practical use is insufficient.

For example, in the case of an ion such as Na ion which is monovalent and low in selectivity with a proton, at a level of 1 ppt (namely, a concentration of $10^{-10}$ mol/L level), the ion is affected by the concentration of proton (about $10^{-7}$ mol/L) which competes with the ion in ion exchanging, and the utilization efficiency of ion exchange groups is conspicuously deteriorated. Therefore, with an ion exchange capacity of less than 0.3 mmol/g, the ion removing effect is hardly exerted unless a considerably large amount of ion adsorptive resin is used. On the other hand, if the adsorptive functional groups are introduced in an amount exceeding 10 mmol/g, the reaction proceeds not only at the resin surface, but also inside the resin, and by-products produced by the reaction remain therein, which undesirably elute as impurities, for example, in water treatment.

Examples of the adsorptive functional groups include the followings.

Suitable ion exchange groups include sulfonic acid group, carboxylic acid group and phosphoric acid group as cation exchange groups; quaternary ammonium salt group, pyridinium salt group and tertiary-secondary amino group as anion exchange groups; and iminodiacetic acid group, mercapto group and ethylenediamine group as chelate groups.

As group specific affinity adsorptive groups, Cibacron Blue F3G-A, Protein A, concanavalin A, heparin, tannin, metal chelate groups, etc. may be mentioned.

As the affinity adsorptive groups, antigens or antibodies can also be introduced.

These groups can each be bonded alone or in combination or these groups can be bonded and introduced in combination with other functional groups, such as a hydroxyl group or the like.

From the viewpoints of heat stability of the adsorptive functional groups in sinter molding and their thermochemical stability in a practical environment, the cation exchange groups are preferably of the sulfonic acid type which is a strong acid, and the anion exchange groups are preferably of a quaternary ammonium salt type or pyridinium salt type which is a strong base.

Furthermore, there may be employed a method according to which the functional group is converted to a metal salt and the metal is substituted with a proton after molding of the sintered body. In general, by converting to a metal salt, the heat resistance of the functional group is improved so that the range of employable conditions is expanded up to higher sintering temperature than the sintering temperature in the case of no substitution being carried out. Moreover, a method in which substitution with a halogen, such as chlorine is carried out, can similarly be employed. Specifically, a sulfone group can be used in the form of sodium sulfonate by contacting with an aqueous NaOH solution.

The method for introducing adsorptive functional groups is not particularly limited, and, for example, an ion exchange group can be introduced by the following method.

In the case of a cation exchange group, a method of introducing a sulfonic acid group into an aromatic compound by a substitution reaction with a sulfonation reagent, a method of addition of a sulfite salt, or the like are included. For example, styrene or glycidyl methacrylate and a crosslinking agent are graft polymerized on resin particles irradiated with γ rays, and thereafter styrene is reacted with chlorosulfonic acid or glycidyl methacrylate is reacted with an aqueous sodium sulfite solution to introduce a sulfone group. There is another method wherein a monomer having a sulfonic acid group, such as a styrenesulfonate salt, is introduced by direct graft polymerization.

In the case of an anion exchange group, for example, chloromethylstyrene or glycidyl methacrylate is graft polymerized on resin particles irradiated with γ rays, and thereafter a quaternary ammonium group is introduced. In the case of chloromethylstyrene, treatment with trimethylamine is employed. In the case of glycidyl methacrylate, a quaternary ammonium group is introduced by reaction with a trimethylamine hydrochloride. Furthermore, there is a method of directly graft polymerizing a monomer having a quaternary ammonium group, such as a vinylbenzyl-trimethylammonium salt.

In the case of a chelate exchange group, for example, a method comprising: graft polymerizing a solution containing glycidyl methacrylate and divinylbenzene dissolved in ethanol with polymeric resin particles irradiated with γ rays, followed by reacting with a 1:1 mixed solution of dimethyl sulfoxide and water containing sodium iminodiacetate to introduce a chelate exchange group, is included.

In the present invention, since the adsorptive functional groups are not directly bonded to the resin particles but are introduced into a layer in which graft polymer chains are formed, the present invention is superior in that the reaction is moderate and can readily be controlled, with less products formed by side-reaction as compared with, for example, a direct method of introducing a sulfone group into a polyolefin using hot concentrated sulfuric acid, or the like.

The shape of the thus obtained adsorptive resin particles is not particularly limited. The particles may be in the form of true spheres or they may be amorphous, and may consist of primary particles, or may be secondary particles comprising a plurality of primary particles which are agglomerated and integrated, or secondary particles which are further ground. The particle diameter is preferably 300 μm or less, more preferably 10 μm or more but less than 100 μm. If the particle diameter is more than 300 μm, the size of the pores of the resulting sintered body will also be large, and the frequency of meeting of the material to be adsorbed and the adsorptive functional groups is lowered to result in low adsorption efficiency. On the other hand, if the particle diameter is less than 10 μm, the size of pores of the sintered body will be small, and water and gas permeability decreases, which is not practical.

<Method of Production of Adsorptive Sintered Body>

The sintered body having adsorbability (hereinafter referred to as "adsorptive sintered body") of the present invention can be obtained by the following methods.

The first method comprises sintering a mixture of thermoplastic resin particles and resin particles on which is formed a crosslinked layer into which adsorptive functional groups can be introduced, thereby producing a porous resin matrix, and then reacting the adsorptive functional groups with the matrix.

The second method comprises sintering a particle mixture obtained by mixing thermoplastic resin particles with resin particles on which functional groups having adsorbability are introduced through graft polymer chains.

The third method comprises sintering thermoplastic resin particles to produce a sintered body, then forming a crosslinked layer on the surface of the sintered body, and subsequently reacting the crosslinked layer with functional groups having adsorbability which can react with the crosslinked layer.

FIG. 1 shows flow charts of these methods.

According to the first method, since the adsorptive functional groups are introduced into the sintered body in which the crosslinked layer has been formed after the sintering step, the adsorptive functional groups are not exposed to high temperatures in the sintering step. Therefore it is an advantage of the first method that even when adsorptive functional groups relatively inferior in heat stability are used, any concern about the heat decomposition of the adsorptive functional groups and the production of impurities caused by the heat decomposition will not be necessary.

The second method is advantageous in that the functional groups are previously introduced into resin particles by graft polymerization in the liquid phase, and hence it is easy to uniformly introduce the adsorptive functional groups onto the surface.

The third method has an advantage that the steps are the simplest.

As can be seen from FIG. 1, the production of the adsorptive sintered body comprises: mixing of particles, packing of particles in a metal mold, sintering, forming crosslinked layer, and introducing adsorptive functional groups. Among them, methods for forming the crosslinked layer and for introducing the adsorptive functional groups are as mentioned above. Methods for mixing the particles, packing the particles in a metal mold and sintering them will be explained below.

Mixing of thermoplastic resin particles with adsorptive resin particles, and mixing of thermoplastic resin particles with resin particles in which is formed a crosslinked layer into which the adsorptive functional groups can be introduced, can be carried out with a tumbling mixer, Lehdige mixer, a high-speed flow-type mixer, a twin-cylinder mixer, etc., and the apparatus and the mixing conditions are preferably selected so as not to cause electrostatic charge on the particulate materials during mixing. If the particulate materials are electrostatically charged, the particles will be apt to agglomerate with each other to make it difficult to uniformly mix the particles. It is preferred to properly ground the mixer and to eliminate static electricity by a blowing type static eliminator, etc. during the supply into, and withdrawal from the mixer of the particles.

The mixing proportion of the adsorptive resin particles or the resin particles on which is formed a crosslinked layer into which the adsorptive functional groups can be introduced, and the thermoplastic resin particles is such that the proportion of the former is preferably 10% by weight or more but less than 70% by weight, more preferably 30% by weight or more but less than 60% by weight, with respect to the total amount of both particles. In order to obtain practically sufficient adsorbability, it is necessary that the proportion of the adsorptive resin particles is 10% by weight or more. If it exceeds 70% by weight, the proportion of the thermoplastic resin particles is small, and the welding of the particles is so incomplete that the sufficient strength of the adsorptive sintered body will not be obtained.

For packing the particle mixture into a metal mold, vibration type packing apparatus such as a vibratory packer, etc. can be employed.

Although the influence of amplitude on the particles upon vibratory packing is relatively small, it is preferred that the vibratory packing is carried out for a necessary and minimum time only, depending on the packing apparatus. This is because a long-term application of vibration brings about re-distribution of particles, namely, the sinking of the particles with smaller diameter into the lower part, which may spoil the effect of the uniform mixing previously carried out.

The material of the metal mold is not particularly limited, and includes iron, stainless steel, brass, aluminum, or the like. Aluminum is preferred because it is high in durability, small in heat capacity, light in weight and easily handled.

The shape of the metal mold is not particularly limited as far as particles can be packed therein, and may be, for example, a mold for forming a plate product which comprises two flat plates provided in parallel to each other and a mold for forming a cylindrical product which comprises two cylinders with different diameters disposed concentrically.

Heating of the particle mixture packed in the metal mold is carried out by any of controllable heating means. There are methods using a hot-air dryer, electric resistance heating, dielectric heating, etc.

The heating temperature is selected from the temperatures around the melting point of the resin, at which the particles are sufficiently welded to each other but the thermoplastic resin does not flow and clog the gaps among the particles. For example, in the case of polyethylene, it is preferably 110° C. or higher but lower than 180° C., more preferably 120° C. or higher but lower than 150° C. The adsorptive functional groups readily decompose at high temperatures, particularly, at a high temperature of 180° C. or higher. The heating temperature for molding the sintered body is, therefore, desirably lower than 180° C.

The shape of the adsorptive sintered body of the present invention is not particularly limited and may be in any shape, such as sheet, block, pipe, column and sphere.

The average pore diameter of the sintered body of the present invention is preferably 1 μm or more but less than 100 μm. If the pore diameter is less than 1 μm, sufficient water permeation and gas permeation will not be obtained. If it exceeds 100 μm, the frequency of meeting of the substance to be adsorbed and the adsorptive functional groups will be reduced and the adsorbability will be insufficient from the beginning of use to cause the effluence of the impurities to be adsorbed. The average pore diameter is obtained in the following manner. That is, the measurement of minor axis and major axis is conducted on 50 or more adjacent pores in a magnified photograph of the surface and section of the sintered body, and the average pore diameter is shown by an average value of the minor axes and the major axes.

The porosity of the sintered body of the present invention is preferably 20% or more but less than 60%, more preferably 30% or more but less than 50%. If the porosity is less than 20%, water permeation amount and gas permeation amount will be small, which is not practical. If it is more than 60%, the strength of the sintered body will be insufficient. The porosity is obtained by the method mentioned hereafter on the basis of the difference in mass between the sintered body in the state of being impregnated with water and the same in the dried state.

The present invention provides resin particles having various adsorptive functional groups on the surface at a high concentration, and an adsorptive sintered body containing said particles in a large amount and having a controlled pore diameter and a thickness which cannot be obtained in the conventional membrane materials. Therefore, a medium which can adsorb, concentrate and remove by separation, the components present in a liquid or gas in trace amounts can be obtained.

Especially, an adsorptive sintered body into which ion adsorptive functional groups are introduced can remove fine particles, cation components, anion components, alkali metals, alkaline earth metals and transition metals to extremely low concentrations. For this reason as well as its high water permeability, it can be suitably used in the fields of the preparation of ultrapure water, etc.

The present invention will be described in detail with reference to examples in which ion exchange groups are used as the adsorptive functional groups.

<Method of Measurement>

The methods of measurement in the examples are as follows.

(1) Melt Flow of Thermoplastic Resin:

MI (melt index) value was measured in accordance with ASTM D1238.

(2) Particle Diameter:

The minor axes and major axes of 50 or more particles were measured in a magnified photograph of the particles, and an average value thereof was calculated.

(3) Amount of Crosslinked Layer Introduced:

The weight of the resin particles on which a crosslinked layer was to be introduced was previously measured. The weight of the resin particles was subtracted from the weight of the resulting crosslinked particles, and the value after the subtraction was divided by the weight of the resin particles to obtain the amount of the introduced crosslinked layer.

(4) Index of Distribution of Adsorptive Functional Groups:

After embedding the adsorptive resin particles into a resin, the sample is cut by a microtome or the like to expose the section of the particle. The cut sample with exposed section is set in a scanning electron microscope and is magnified to a suitable magnification. Then the sample is subjected to a line analysis from the surface to the center of the particle for an element specific to the adsorptive functional groups by an energy dispersion type X-ray analyzer (EDX). Intensities at the surface portion and the center portion are read from a line profile obtained by the line analysis. The intensity obtained as a line profile is proportional to the amount of the element present in the sample. For comparison of distribution in the surface portion and in the center portion, the index of distribution of the adsorptive functional groups is expressed by a value obtained by dividing [intensity of EDX line profile in the center portion of particle (height of peak)] by [intensity of EDX line profile in the surface portion of particle (height of peak)].

(5) Amount of Introduced Cation Exchange Group:

Ten grams of the adsorptive resin into which cation exchange groups were introduced was weighed and immersed in pure water. Then, the resin was packed into a chromatographic column made of glass, and washed successively with 1 N NaOH solution, pure water, 1 N nitric acid solution and pure water in this order. Thereafter, 1 N NaCl solution was passed through the column and the resulting permeated water was titrated with 1 N NaOH to obtain an ion exchange capacity. Thereafter, the adsorptive resin was subjected to substitution with ethanol and vacuum dried at 50° C. for 2 hours to obtain its dry weight. The amount of introduced cation exchange group per weight was thus calculated.

(6) Amount of Introduced Anion Exchange Group:

Ten grams of the adsorptive resin into which anion exchange groups are introduced was weighed and a sufficient amount of 1 N sodium hydroxide solution was passed through the resin to convert the anion exchange groups to OH type. Thereafter, 1 N aqueous NaCl solution was passed through the resin so that Cl ions were adsorbed and then a sufficient amount of 1 N potassium nitrate solution was passed therethrough, and the resulting permeated liquid was subjected to precipitation titration to obtain an amount of adsorbed Cl ions. Thereafter, the adsorptive resin was subjected to substitution with ethanol and vacuum dried at 50° C. for 2 hours to obtain its dry weight. The amount of introduced anion exchange group per weight was thus calculated.

(7) Amount of Introduced Chelate Exchange Group:

A sintered body into which chelate exchange groups are introduced is converted to the H form with 1 N hydrochloric acid, and then a 100 ppm copper sulfate solution was passed through the sintered body so that Cu ions were adsorbed. The adsorbed Cu ions were desorbed with 1 N hydrochloric acid to obtain the copper ion concentration of the desorption solution by atomic absorption spectrometry. Then, the adsorptive resin was subjected to substitution with ethanol and vacuum drying at 50° C. for 2 hours to obtain its dry weight. The amount of the introduced chelate exchange groups per weight was thus calculated. The atomic absorption spectrometric apparatus used was Model SAS-727 manufactured by Seiko Denshi Kogyo Co., Ltd.

(8) Average Pore Diameter:

The average pore diameter was obtained by measuring minor axes and major axes of 50 or more adjacent pores in magnified photographs of surface and section, and calculating an average value thereof.

(9) Porosity:

The sintered body is immersed in ethanol for 1 hour, and then immersed in pure water for 20 minutes×5 times. After water on the surface is removed, the mass of the sintered body is measured. Thereafter, the sintered body is again immersed in ethanol and dried at 50° C. for 10 hours. Then, the mass of the sintered body after drying is measured, and the difference 'a' between the masses is obtained in the unit of $cm^3$. Separately, the size of the sintered body is measured and an apparent volume 'b' is obtained in the unit of $cm^3$. The porosity is calculated by a/b.

(10) TOC:

A sample water is introduced into a TOC meter A1000XP manufactured by Anatel Co., Ltd. and the resulting measured value is used as TOC. The ΔTOC is obtained as: where ultrapure water is passed through the adsorptive sintered body (or a column packed with the adsorptive resin) into which ion exchange groups are introduced, TOC in the sample water at the inlet and the outlet are measured, and the difference ([TOC at the outlet]−[TOC at the inlet]) is taken as ΔTOC.

(11) The Number of Fine Particles:

A sample water is introduced into a fine particle counter ULTRA DI-50 manufactured by PMS Co., Ltd. to measure the number, and the total number of particles smaller than 0.1 μm is used as an index. The Δfine particles is obtained as: the total numbers of fine particles in the sample water at the inlet and the outlet of the adsorptive sintered body are measured, and the difference ([amount of fine particles at the outlet]−[amount of fine particles at the inlet]) is taken as Δ fine particles.

(12) Amount of Water Permeation:

Ultrapure water is permeated at a differential pressure of 9.8 $N/cm^2$ through the adsorptive sintered body into which ion exchange groups are introduced, and the amount of water permeation is obtained by measuring the weight of the permeated water.

(13) Metal Ion Content in Water:

A sample water is concentrated by 10-100 times in a clean room, and the metal ion content is measured by ICP-MS manufactured by Yokokawa Analytical Systems Co., Ltd.

(14) Resistivity of Treated Water:

Resistivity of treated water is directly measured with Model AQ-11 manufactured by To a DKK Co., Ltd.

Examples of Adsorptive Resin Particles

Example 1

Polyethylene powder "SUNFINE UH901" (trademark) having a weight-average molecular weight of 3,500,000 manufactured by Asahi Kasei Kabushiki Kaisha was sieved with a metal gauze of 200 mesh to obtain polyethylene powder having a particle diameter of 83 μm. The MI value of the resin was nearly 0. Two hundred and fifty grams of the powder was introduced into a polyethylene bag having aluminum vapour deposition and sealed with nitrogen gas, which was then irradiated with γ rays of 100 kGy. In 1 L of isopropyl alcohol were dissolved 300 g of styrene and 43.6 g of divinylbenzene (purity 55%), and the solution was heated to 50° C. and subjected to bubbling with nitrogen for 30 minutes to remove the dissolved oxygen. Into the resulting monomer solution was introduced the "SUNFINE UH901" irradiated with γ rays under bubbling with nitrogen. The mixture was stirred for 3 hours, and the reaction slurry was filtered with a Buchner funnel, washed with 3 L of dichloromethane and vacuum dried. Yield of the resulting grafted product was 410 g, and the amount of the crosslinked layer formed was 64%. Two hundred grams of the grafted product was introduced into a reaction solution prepared by dissolving 71 g of chlorosulfonic acid in 1 L of dichloromethane, followed by stirring for 3 hours. Into this reaction solution was introduced 500 mL of isopropyl alcohol, followed by stirring for a while, filtering with a Buchner funnel, washing with 1 L of isopropyl alcohol and 10 L of pure water, and vacuum drying. Yield of the resulting cation type ion adsorptive resin was about 240 g. The resin had a particle diameter of 84 μm and an ion adsorption capacity of 2.4 mmol/g. The index of distribution of adsorptive functional groups was 0.7 measured for S (sulfur) by EDX.

Example 2

One hundred mL of the ion adsorptive resin obtained in Example 1 was packed in a glass column of 15 mmϕ in inner diameter and regenerated with 1 N nitric acid. Then, hot ultrapure water at 80° C. was passed through the resin at a flow rate of 100 mL/min for 48 hours, and ΔTOC was obtained.

At the beginning of washing, the ΔTOC was about 500 ppb, but after 24 hours of washing, it was stabilized at about 20 ppb. Thereafter, when ultrapure water of room temperature was passed through the resin, the ΔTOC decreased to 1 ppb or less.

Furthermore, Δfine particles was 0.05/mL.

Comparative Example 1

ΔTOC of ion exchange resin was evaluated in the same manner as in Example 2, except that an ion exchange resin "DIAION PK212" (trademark) manufactured by Mitsubishi Chemical Co., Ltd. was used in place of the ion adsorptive resin of Example 2. When hot ultrapure water was passed through the resin, the ΔTOC was 120-150 ppb even after passing of the water for 48 hours, and the subsequent passing of ultrapure water at room temperature gave a ΔTOC of 10-15 ppb. Moreover, the amount of Δfine particles was 0.3/ml, which was greater by a single digit than in Example 1.

Example 3

In the same manner as in Example 1, 250 g of polyethylene powder "SUNFINE SH801" (trademark) having a weight-average molecular weight of 200,000 manufactured by Asahi Kasei Kabushiki Kaisha was irradiated with γ rays of 100 kGy. The resin had an MI value of 0.08/10 min and a particle diameter of 86 μm. A reaction solution prepared by dissolving 300 g of chloromethylstyrene and 43.6 g of divinylbenzene in 1 L of isopropyl alcohol was subjected to bubbling with nitrogen at 50° C. for 30 minutes, and into the solution was introduced 250 g of the polyethylene powder irradiated with γ rays. After a lapse of 3 hours, the mixture was filtered through the Buchner funnel, washed with 1 L of methylene chloride and vacuum dried. Yield was 480 g, and the amount of the crosslinked layer formed was 92%. The resulting crosslinked particles were immersed in isopropyl alcohol in which 30% of trimethylamine was dissolved, and the reaction was allowed to proceed at 35° C. for 50 hours to convert the crosslinked particles to the form of quaternary ammonium. The resulting anion type ion adsorptive resin was washed with ethanol and water, then subjected to substitution with ethanol, and dried by a vacuum dryer. The ion exchange capacity of the anion type ion adsorptive resin was measured to obtain 3.26 mmol/g. The resulting particles had a particle diameter of 88 μm. The index of distribution of adsorptive functional groups was 0.6 measured after substituting the exchange groups with Cl (chlorine).

Dissolution of TOC from the anion type ion adsorptive resin was evaluated in the same manner as in Example 2 to find that the ΔTOC after washing with hot ultrapure water of 80° C. for 48 hours was 1 ppb or less.

Moreover, the amount of Δfine particles was 0.07/mL.

Example 4

In the same manner as in Example 1, 250 g of polyethylene powder "SUNFINE SH801" manufactured by Asahi Kasei Kabushiki Kaisha was irradiated with γ rays of 100 kGy. The resin had an MI value of 0.08/10 min and a particle diameter of 86 μm. A solution prepared by dissolving 300 g of glycidyl methacrylate and 43.6 g of divinylbenzene in 1 L of isopropyl alcohol was subjected to bubbling with nitrogen at 30° C. to remove dissolved oxygen, and into the solution was introduced 250 g of the polyethylene powder irradiated with γ rays. Reaction was carried out for 0.5 hour, and the grafted resin powder was taken out and washed with isopropyl alcohol. The resulting graft copolymer was introduced into a mixed solution of dimethyl sulfoxide and water with a ratio of 1:1 by volume containing 10% by weight of sodium iminodiacetate dissolved therein, followed by carrying out the reaction at 80° C. for 72 hours. The chelate type ion adsorptive resin thus-obtained had an ion exchange capacity of 0.86 mmol/g.

Dissolution of TOC from this chelate type ion adsorptive resin was evaluated in the same manner as in Example 2 to find that the ΔTOC after washing with hot ultrapure water of 80° C. for 48 hours was 1 ppb or less. The amount of Δfine particles was 0.05/ml.

Examples of Sintered Body

Obtained by Sintering a Mixture of Particles into which Functional Groups were Introduced and Thermoplastic Resin Particles

Example 5

The cation type ion adsorptive resin synthesized in Example 1 and polyethylene powder ("SUNFINE SH801" sieved with a metal gauze of 200 mesh, that had a particle diameter of 84 μm) were mixed at a mass ratio of 50/50. An aluminum extruded tube of with an outer diameter/inner diameter of 60 mmϕ/50 mmϕ was concentrically placed inside an aluminum extruded tube with an outer diameter/inner diameter of 80 mmϕ/70 mmϕ. Using this double tube as a metal mold, the above powder mixture was packed in the space between these tubes by a vibratory packer and sintered by keeping it in a hot-air dryer at 150° C. for 20 minutes. The resulting sintered body had an average pore diameter of 22 μm and a porosity of 42%.

A plate made of polyethylene and a filtration water port was provided at the bottom and top of the resulting cylindrical sintered body, respectively, to make a cartridge type filter as shown in FIG. 2. This filter was set in a commercially available cartridge filter housing made of PFA and 1 N nitric acid was passed therethrough to perform regeneration. Thereafter, dissolution of TOC was evaluated in the same manner as in Example 2. The direction of water passage was the direction of so-called external pressure filtration and this was the direction from outside to inside of the cartridge of FIG. 2.

The ΔTOC after washing with hot ultrapure water of 80° C. for 48 hours was 1 ppb or less. The ion exchange capacity was 0.72 mmol/g. The amount of Δ fine particles was −0.3/mL, meaning that the number of fine particles was less in the treated water. The amount of water permeation was 21,000,000 L/m²·hr·MPa.

Example 6

An anion type sintered body was obtained in the same manner as in Example 5, except that the anion type ion adsorptive resin synthesized in Example 3 was used in place of the cation type ion adsorptive resin synthesized in Example 1. The resulting sintered body had an average pore diameter of 21 μm and a porosity of 40%. The dissolution of TOC of this anion type ion adsorptive body was evaluated in the same manner as in Example 5 to obtain a ΔTOC of 1 ppb or less after washing with hot ultrapure water of 80° C. for 48 hours. The amount of Δfine particles was −0.04/mL which was nearly 0. Furthermore, the resulting anion type porous ion adsorptive body had an ion exchange capacity of 0.96 mmol/g. The amount of water permeation was 20,800,000 L/m²·hr·MPa.

Example 7

A chelate type porous ion adsorptive body was obtained in the same manner as in Example 5, except that the chelate type ion adsorptive resin synthesized in Example 4 was used in place of the cation type ion adsorptive resin synthesized in Example 1. The resulting ion adsorptive body had an average pore diameter of 23 μm and a porosity of 42%.

The dissolution of TOC from this chelate type porous ion adsorptive body was evaluated in the same manner as in Example 5 to obtain a ΔTOC of 1 ppb or less after washing with hot ultrapure water of 80° C. for 48 hours. The amount of Δfine particles was −0.2/mL, namely, the number of fine particles at the outlet was smaller. Furthermore, the resulting porous ion adsorptive body had an ion exchange capacity of 0.36 mmol/g.

Example 8

In order to measure the quality of water before and after filtering through the filters of Examples 5 and 7, model pure water containing metal ions in extremely small amounts was passed through the filters, and metal ions in the supplied water and the treated water which has passed through the filter were analyzed. The passage of water was carried out through the filters of Example 5 and 7 at 20 L/min for 50 days. The results are shown in Table 1.

TABLE 1

|  | Water before filtration | Water filtered through cation type sintered body of Example 5 | Water filtered through chelate type sintered body of Example 7 |
|---|---|---|---|
| Concentration of Zn ion (ppb) | 0.2 | ND | ND |
| Concentration of Na ion (ppt) | 0.97 | 0.45 |  |

In the case of using the cation type porous ion adsorptive body and chelate type porous ion adsorptive body, the reduction of Zn concentration in the ultrapure water was clearly recognized. In the case of the cation adsorptive body, the reduction of Na concentration was also recognized. That is, metal ions were adsorbed to the ion adsorptive sintered bodies.

Examples of Sintered Body

Sintered after Converting the Functional Groups to Metal Salt

Example 9

The cation type ion adsorptive resin synthesized in Example 1 was immersed in 1 N aqueous NaOH solution, followed by filter-washing with water to convert it to the Na type. This Na type cation adsorptive resin dried by a vacuum dryer and polyethylene powders (obtained by sieving "SUNFINE UH901" through a metal gauze of 200 mesh and having a particle diameter of 83 μm) were mixed at a mass ratio of 50/50. An aluminum extruded tube with an outer diameter/inner diameter of 60 mmφ/50 mmφ was concentrically placed inside an aluminum extruded tube with an outer diameter/inner diameter of 80 mmφ/70 mm φ. Using this double tube as a metal mold, the above powder mixture was packed in the space formed between these tubes with application of some vibration. The powder mixture was then sintered by keeping the metal mold in a hot-air dryer at 180° C. for 20 minutes. The resulting sintered body had an average pore diameter of 23 μm and a porosity of 43%.

Plates made of polyethylene and filtration water ports were equipped at the top and bottom of the resulting cylindrical sintered body to make a cartridge type filter as shown in FIG. 2. This filter was set in a commercially available cartridge filter housing made of PFA and 1 N nitric acid was passed therethrough to perform regeneration. Thereafter, dissolution of TOC was evaluated to obtain a ΔTOC of 1 ppb or less after washing with hot ultrapure water of 80° C. for 48 hours. The ion exchange capacity of the porous ion adsorptive body was 0.93 mmol/g. That is, although the sintering was carried out at a relatively high temperature, the decomposition of adsorptive groups was not observed and the increase of TOC component due to heat decomposition was also not recognized. The amount of Δfine particles was −0.1/mL, and the number of fine particles was somewhat smaller in the treated water. The amount of permeated water was 22,000,000 L/m²·hr·MPa.

Example of Sintered Body

Sintered after Halogenation of Functional Group

Example 10

The anion type ion adsorptive resin synthesized in Example 3 was immersed in a 1 N aqueous hydrochloric acid solution, followed by filter washing with water to convert it to the Cl type. This Cl type anion adsorptive resin was dried by a vacuum dryer and an anion type porous ion adsorptive body was obtained in the same manner as in Example 9. The resulting ion adsorptive body had an average pore diameter of 21 μm and a porosity of 39%.

Dissolution of TOC from this anion type porous ion adsorptive body was evaluated to obtain a ΔTOC of 1 ppb or less after washing with hot ultrapure water of 80° C. for 48 hours. The ion exchange capacity of the ion adsorptive body was 0.65 mmol/g. The amount of Δfine particles was −0.04/mL, and no fine particles were generated from the sintered body. The amount of water permeation was 19,500,000 L/m²·hr·MPa.

Examples of Sintered Body

After Sintering a Mixture of Crosslinked Resin Particles and Thermoplastic Resin, Functional Groups were Introduced Example 11

Polyethylene powder SUNFINE UH901 manufactured by Asahi Kasei Kabushiki Kaisha was sieved through a metal gauze of 200 mesh to obtain polyethylene particles having a particle diameter of 86 μm. Two hundred and fifty grams of the resulting particles were introduced in a polyethylene bag with aluminum vapour deposition, sealed with nitrogen gas, and irradiated with γ rays of 100 kGy. In 1 L of isopropyl alcohol were dissolved 375 g of styrene and 54.5 g of divinylbenzene (purity 55%), and the solution was heated to 50° C. and subjected to bubbling with nitrogen for 30 minutes to remove the dissolved oxygen. Into this monomer solution under bubbling with nitrogen was introduced the above SUNFINE UH901 irradiated with γ rays. The mixture was stirred for 3 hours, and the reaction slurry was filtered through a Buchner funnel, washed with 3 L of dichloromethane and vacuum dried. The yield of the resulting grafted copolymer was 410 g, and the amount of the crosslinked layer formed was 64%. The copolymer had a particle diameter of 87 μm.

Example 12

The crosslinked particles synthesized in Example 11 and polyethylene particles having a particle diameter of 85 μm and obtained by sieving SUNFINE UH901 through a metal gauze of 200 mesh were mixed at a weight ratio of 50/50. The resulting particle mixture was packed into an aluminum metal mold having a channel in the form of a disc of 25 mmφ×3 mmt, and sintered by heating in a hot-air dryer at 180° C. for 30 minutes. The resulting sintered body had an average pore diameter of 22 μm and a porosity of 41%.

In a 500 mL separable flask were charged 200 mL of methylene chloride and the sintered body with 25 mmφ×3 mmt prepared as above, followed by cooling to 5° C. or lower and then adding 0.26 g of chlorosulfonic acid with stirring. After the completion of the addition, the content was heated to 30° C. and kept at that temperature for 3 hours. Then, 20 mL of ethanol was added and after 30 minutes, the sintered body was taken out, washed with ethanol and water, and vacuum dried.

This sintered body into which cation exchange groups were introduced had a pore diameter of 21 μm and a porosity of 41%. The ion exchange capacity was 0.87 mmol/g. The ΔTOC measured by setting the sintered body in a holder for exclusive use, and passing pure water through it was 1 ppb or less, and the amount of Δfine particles was nearly 0/mL.

Comparative Example 2

In a separable flask were charged 50 g of the crosslinked particles obtained in Example 11 and 200 mL of methylene chloride, followed by cooling to 5° C., and adding dropwise 17.5 g of chlorosulfonic acid with stirring. After the completion of the addition, the content was heated to 30° C. and kept at that temperature for 3 hours. Then, 50 mL of ethanol was added, and the content was kept for 30 minutes, followed by filtration through the Buchner funnel, washing with ethanol and pure water, and vacuum drying. The resulting sulfonated resin particles and particles with a particle diameter of 84 μm, obtained by sieving SUNFINE UH901 through a metal gauze of 200 mesh were mixed at a weight ratio of 50/50. The resulting mixture had an ion exchange capacity of 0.82 mmol/g. This mixture was packed into the aluminum metal mold used in Example 9 and heated at 180° C. for 30 minutes by a hot-air dryer to form a sintered body. The resulting sintered body had an ion exchange capacity of 0.55 mmol/g. That is, the ion exchange capacity decreased to about 70% of the capacity before sintering.

Example 13

In the same manner as in Example 11, 250 g of polyethylene particles having a particle diameter of 86 μm, obtained by sieving SUNFINE UH901 (manufactured by Asahi Kasei Kabushiki Kaisha) through a metal gauze of 200 mesh, was irradiated with γ rays of 100 kGy. A reaction solution prepared by dissolving 375 g of chloromethylstyrene and 54.5 g of divinylbenzene (purity 55%) in 1 L of isopropyl alcohol was subjected to bubbling with nitrogen at 50° C. for 30 minutes, and into the solution was introduced 250 g of the polyethylene particles irradiated with γ rays. After a lapse of 3 hours, the mixture was filtered through the Buchner funnel, washed with 1 L of acetone and vacuum dried. The yield of the resulting crosslinked particles was 470 g. The amount of the crosslinked layer formed was 88%. The particle diameter was 87 μm.

Example 14

The crosslinked particles synthesized in Example 13 and polyethylene particles having a particle diameter of 85 μm, obtained by sieving SUNFINE UH901 through a metal gauze of 200 mesh, were mixed at a weight ratio of 50/50. The resulting particle mixture was packed into an aluminum metal mold having a channel in the form of a disc of 25 mmφ×3 mmt, and sintered by heating in a hot-air dryer at 180° C. for 30 minutes.

In a 500 mL separable flask were charged 200 mL of isopropyl alcohol containing 30% of trimethylamine dissolved therein and the sintered body of 25 mmφ×3 mmt prepared as above, and the reaction was carried out at 35° C. for 50 hours to convert it to a quaternary ammonium form. After the completion of the reaction, the sintered body was taken out, washed with ethanol and water, and vacuum dried.

The resulting anion type porous ion adsorptive body had an ion exchange capacity of 0.95 mmol/g.

Comparative Example 3

The crosslinked particles obtained in Example 13 were immersed in isopropyl alcohol containing 30% of trimethylamine dissolved therein and reaction was carried out at 35° C. for 50 hours to convert the particles to a quaternary ammonium form. The resulting anion adsorptive resin was washed with ethanol and water, then subjected to substitution with ethanol, and dried by a vacuum dryer.

The resulting resin particles in the quaternary ammonium form and particles having a particle diameter of 85 μm, obtained by sieving SUNFINE UH901 through a metal gauze of 200, mesh were mixed at a weight ratio of 50/50. The mixture had an ion exchange capacity of 0.93 mmol/g. This mixture was packed into the same aluminum metal mold as used in Example 9 and heated at 180° C. for 30 minutes by a hot-air dryer to form a sintered body. The resulting sintered body had an ion exchange capacity of 0.28 mmol/g. That is, by the sintering, the ion exchange capacity decreased to about 30% of the capacity before sintering.

Example 15

In the same manner as in Example 11, 250 g of polyethylene particles (having a particle diameter of 84 μm, obtained by sieving SUNFINE SH801 manufactured by Asahi Kasei Kabushiki Kaisha through a metal gauze of 200 mesh) were irradiated with γ rays of 100 kGy. A solution prepared by dissolving 300 g of glycidyl methacrylate and 43.6 g of divinylbenzene in 1 L of isopropyl alcohol was subjected to bubbling with nitrogen at 30° C. to remove dissolved oxygen, and into the solution were introduced 250 g of the above polyethylene particles irradiated with γ rays. The reaction was carried out at 30° C. for 0.5 hour, and the graft crosslinked product was taken out and washed with isopropyl alcohol. The yield of the resulting graft copolymer was 395 g. The amount of the crosslinked product was 58%, and it had a particle diameter of 84 μm.

The resulting graft copolymer and polyethylene particles having a particle diameter of 85 μm, obtained by sieving SUNFINE UH901 through a metal gauze of 200 mesh, were mixed at a weight ratio of 50/50. The resulting particle mixture was packed into an aluminum metal mold having a channel in the form of a disc of 25 mm φ×3 mmt, and sintered by heating in a hot-air dryer at 180° C. for 30 minutes. The resulting sintered body had an average pore diameter of 20 μm and a porosity of 39%.

In a 500 mL separable flask were charged a mixed solution of dimethyl sulfoxide containing 10% by weight of sodium iminodiacetate and water (1/1 in volume ratio) and the sintered body of 25 mmφ×3 mmt prepared as above, and reaction was carried out at 80° C. for 72 hours. After the completion of the reaction, the sintered body was taken out, washed with water, and vacuum dried. In the resulting chelate type porous ion adsorptive body, the amount of the chelate exchange group introduced was 1.75 mmol/g.

Examples of Sintered Body

Into which Functional Groups were Introduced by Radiation Grafting

Example 16

A sheet-like polyethylene particle sintered body, SUNFINE AQ-800 manufactured by Asahi Kasei Kabushiki Kaisha (particle diameter: 20 μm, membrane thickness: 2 mm, porosity: 35%), was irradiated with γ rays of 100 kGy. A solution prepared by dissolving 80 g of styrene and 6 g of divinylbenzene (purity 55%) in 1 L of isopropyl alcohol was heated to 70° C. and subjected to bubbling with nitrogen for 30 minutes to remove dissolved oxygen. Into this monomer solution were introduced 60 g in total of discs of φ647 mm cut out from the above SUNFINE AQ-800 irradiated with γ rays. Reaction was carried out for 5 hours with stirring, and the sintered body was taken out, washed with isopropyl alcohol, and then dried by a vacuum dryer of 50° C. for 2 hours. The total weight after drying was 109 g, and the amount of the crosslinked layer produced was 82%. The resulting sintered body in which a crosslinked layer was formed had a pore diameter of 20 μm and a porosity of 34%.

The resulting sintered body was immersed in dichloroethane, and then a dichloroethane solution containing 10% of dissolved chlorosulfonic acid was added dropwise, followed by carrying out reaction for 1 hour under ice cooling and for an additional 30 minutes at room temperature to introduce chlorosulfonic acid.

The ion adsorption capacity of the resulting cation adsorptive body was 1.87 mmol/g, and the amount of water permeation was 24,100,000 L/m²·hr·MPa. It had an average pore diameter of 19 μm and a porosity of 33%.

A part of the cation adsorptive body was cut out, and the distribution of the sulfone groups in the sectional direction of the particles constituting the sintered body was analyzed to obtain an index of adsorptive functional group distribution of 0.8.

Example 17

SUNFINE AQ-800 was irradiated with γ rays of 100 kGy. A solution prepared by dissolving 120 g of chloromethylstyrene and 6 g of divinylbenzene (purity 55%) in 1 L of isopropyl alcohol was heated to 50° C. and subjected to bubbling with nitrogen for 30 minutes to remove dissolved oxygen. Into this monomer solution were introduced 60 g in total of discs of φ47 mm cut out from the SUNFINE AQ-800 irradiated with γ rays. Reaction was carried out for 2 hours with stirring, and the sintered body was taken out, washed with isopropyl alcohol, and then dried by a vacuum dryer. The total weight after drying was 105 g, and the amount of the crosslinked layer formed was 75%. The resulting sintered body in which a crosslinked layer was formed had an average pore diameter of 19 μm and a porosity of 30%.

The resulting sintered body was immersed in isopropyl alcohol containing 30% of trimethylamine dissolved therein, and reaction was carried out at 35° C. for 50 hours to convert the introduced chloromethyl-styrene to a quaternary form. The resulting anion adsorptive body was washed with ethanol and water, then subjected to substitution with ethanol, and dried by a vacuum dryer.

The amount of the cation exchange groups introduced into the anion adsorptive body (ion exchange capacity) was 3.26 mmol/g, and the amount of water permeation was 19,000,000 L/m²·hr·MPa. It had an average pore diameter of 19 μm and a porosity of 30%. The sintered body was immersed in an aqueous NaCl solution to adsorb Cl ions to the anion exchange groups, and then the section of the particles constituting the sintered body was subjected to EDX analysis for Cl. As a result, the index of distribution of the anion exchange groups was 0.75.

Example 18

The sintered bodies having cation and anion exchange groups synthesized in Examples 16 and 17 were set in a holder for exclusive use, and ultrapure water was passed therethrough and the resistivity and TOC concentration of the treated water were measured.

The resistivity measured when 24 hours elapsed from the start of the passage of water was 18.2 for the cation adsorptive body and 18.1 for the anion adsorptive body, while the resistivity of the supplied water as it was, was 18.1. TOC was 2.0 ppb for the supplied water and 2.0 for the cation adsorptive body and 1.9 for the anion adsorptive body. Thus, neither ionic impurities nor TOC eluted.

Example 19

Adsorbability for Zn and Na of the cation adsorptive sintered body of Example 16 was measured in the same manner as in Example 8. The results are shown in Table 2.

TABLE 2

|  | Water before filtration | Water filtered through cation type sintered body of Example 16 |
|---|---|---|
| Concentration of Zn ion (ppb) | 0.19 | 0.01 |
| Concentration of Na ion (ppt) | 0.98 | 0.44 |

Concentrations of Zn and Na in the model pure water were clearly reduced by using the cation adsorptive body, and it was found that the ion adsorbability is excellent.

Comparative Example 4

As a comparative example in which the cation exchange groups were introduced without a crosslinked layer, SUNFINE AQ-800 used in Example 17 was immersed in a concentrated sulfuric acid at 80° C. for 8 hours to obtain a sulfonated sintered body.

The resulting sintered body had a brown color as a whole, and certain portions were scorched black. When the sintered body was touched with the hand, visible particles fell off therefrom.

Discs of φ47 mm were cut out of the sintered body and set in a holder for exclusive use, and water was passed to measure ΔTOC and Δfine particles. As a result, the ΔTOC was 25 ppb, which was 25 times more than that of the sintered bodies of the present invention.

The amount of Δfine particles was 1.8/mL, which was higher by double digits. When the treated water was filtered with a nonwoven fabric, black materials with a visible size were filtered off on the nonwoven fabric.

INDUSTRIAL APPLICABILITY

The present invention provides an excellent adsorptive structure which hardly causes the generation of impurities, such as TOC, and does not contaminate the treated liquid or gas. It is excellent in water permeability and gas permeability, and can remove even the impurities of extremely low concentrations. Particularly, the present invention provides an adsorptive sintered body which can reduce metal ions in ultrapure water to extremely low concentrations.

The invention claimed is:

1. Grafted polyethylene resin particles, wherein the surface of each of the grafted polyethylene resin particles comprises functional groups having adsorbability bonded through graft polymer chains, wherein the polyethylene resin particles have a weight-average molecular weight of 1,000,000 or more and wherein the particle diameter being 10 μm or more and less than 100 μm, wherein a proportion of a crosslinked layer formed by graft copolymerization is 50% by weight or more but less than 150% by weight based on the weight of polyethylene resin particles as substrate, wherein the crosslinked layer formed by graft polymerization being a copolymer layer formed with styrene and divinylbenzene, a polymer layer formed with glycidyl methacrylate, a copolymer layer of glycidyl methacrylate and acrylonitrile, or a copolymer layer of glycidyl methacrylate and divinylbenzene.

2. The resin particles according to claim 1, wherein the functional groups having adsorbability are localized at the surface of the resin particles.

3. The resin particles according to claim 1, wherein the concentration of the functional groups having adsorbability is 0.3 mmol/g or more and less than 10 mmol/g.

4. The resin particles according to claim 1, wherein the functional groups having adsorbability are ion exchange groups.

5. The resin particles according to claim 1, wherein the crosslinked layer comprises a copolymer of styrene and divinylbenzene.

6. The resin particles according to claim 1, wherein the resin particles are resin particles constituting a sintered body used as an adsorptive body which is less in elution of impurities.

7. The resin particles according to claim 1, wherein the polyethylene resin particles comprising functional groups having adsorbability bonded through graft polymer chains have an index of distribution of adsorptive functional groups of less than 0.9, the index of distribution of adsorptive functional groups is a value obtained by dividing an intensity of an energy dispersion type X-ray analyzer's line profile in the center portion of particle by an intensity of an energy dispersion type X-ray analyzer's line profile in the surface portion of particle.

* * * * *